US012800719B2

(12) United States Patent
Bialer et al.

(10) Patent No.: US 12,800,719 B2
(45) Date of Patent: Nov. 17, 2026

(54) RADAR POINT CLOUD AGGREGATION OF DYNAMIC OBJECTS WITH MINIMIZED DISPARITY

(71) Applicant: GM Global Technology Operations LLC, Detroit, MI (US)

(72) Inventors: Oded Bialer, Petach Tikva (IL); Yuval Haitman, Ramat-Gan (IL); Oren Longman, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 18/645,559

(22) Filed: Apr. 25, 2024

(65) Prior Publication Data

US 2025/0334672 A1 Oct. 30, 2025

(51) Int. Cl.

*G01S 7/41* (2006.01)
*G01S 13/52* (2006.01)
*G01S 13/931* (2020.01)

(52) U.S. Cl.

CPC .............. *G01S 7/415* (2013.01); *G01S 13/52* (2013.01); *G01S 13/931* (2013.01)

(58) Field of Classification Search

CPC ......... G01S 7/415; G01S 13/52; G01S 13/931
See application file for complete search history.

(56) References Cited

U.S. PATENT DOCUMENTS 12,522,223 B2 * 1/2026 Enam ................ B60W 50/0098
2021/0018615 A1 * 1/2021 Su ......................... G01S 13/726
2021/0295113 A1 * 9/2021 Sless ....................... G06F 18/25
2024/0077617 A1 * 3/2024 Lawson ................ G01S 13/584
2024/0280372 A1 * 8/2024 Abbott .................... G01S 17/89
2024/0302517 A1 * 9/2024 Samangooei ......... G01S 13/583
2025/0239085 A1 * 7/2025 Song ..................... G01S 7/4808
2025/0264599 A1 * 8/2025 Narayanan .............. G06T 7/246

OTHER PUBLICATIONS

Y. Long, D. Morris, X. Liu, M. Castro, p. Chakravarty and P. Narayanan, "Full-Velocity Radar Returns by Radar-Camera Fusion," 2021 IEEE/CVF International Conference on Computer Vision (ICCV), Montreal, QC, Canada, 2021, pp. 16178-16187, doi: 10.1109/ICCV48922.2021.01589. (Year: 2021).*

(Continued)

*Primary Examiner* — Brady W Frazier
*Assistant Examiner* — Noah Yi Min Zhu
(74) *Attorney, Agent, or Firm* — CANTOR COLBURN LLP

(57) ABSTRACT

A system and method for operating a host vehicle. A first detection of a first reflection point from an object is received during a first time frame of a radar. A first position and a first Doppler frequency of the first detection are direction. The first position is updated to a first predicted position in a second time frame using the first Doppler frequency. Updating includes using an object-based component of the first Doppler frequency to shift the first detection from the first position to an intermediate position in the second time frame and using a vehicle-based component of the first Doppler frequency to shift the first detection from the intermediate position to the first predicted position. The prediction position is aggregated with a second detection of a second reflection point from the object, and the object is detected from the aggregation.

20 Claims, 6 Drawing Sheets

(56) References Cited

OTHER PUBLICATIONS

B. Tan et al., "3-D Object Detection for Multiframe 4-D Automotive Millimeter-Wave Radar Point Cloud," in IEEE Sensors Journal, vol. 23, No. 11, pp. 11125-11138, Jun. 1, 2023, doi: 10.1109/JSEN.2022.3219643. (Year: 2023).*

S. Zhu, A. Yarovoy and F. Fioranelli, "DeepEgo: Deep Instantaneous Ego-Motion Estimation Using Automotive Radar," in IEEE Transactions on Radar Systems, vol. 1, pp. 166-180, 2023, doi: 10.1109/TRS.2023.3288241. (Year: 2023).*

P. Palmer, M. Krueger, R. Altendorfer and T. Bertram, "Ego-Motion Estimation and Dynamic Motion Separation from 3D Point Clouds for Accumulating Data and Improving 3D Object Detection," AmE 2023—Automotive meets Electronics; 14. GMM Symposium, Dortmund, Germany, 2023, pp. 86-91. (Year: 2023).*

Yang et al., "RadarNet: Exploiting Radar for Robust Perception of Dynamic Objects," 2020, https://doi.org/10.48550/arXiv.2007.14366 (Year: 2020).*

Ding et al., "Kalman-Based Scene Flow Estimation for Point Cloud Densification and 3D Object Detection in Dynamic Scenes," Jan. 31, 2024, https://doi.org/10.3390/s24030916 (Year: 2024).*

* cited by examiner

RADAR POINT CLOUD AGGREGATION OF DYNAMIC OBJECTS WITH MINIMIZED DISPARITY

INTRODUCTION

The subject disclosure relates to radar detection of moving objects and, in particular, to a system and method for aggregating radar detections over multiple time frames.

Radar can be used to obtain point clouds including detections of reflections from objects in a field of view of the radar. The detections can be used to determine a distance to the object and speed, as well as a shape of the object and/or a class of the object. The sparsity of detections within a point cloud can lead to inaccurate estimates of object shape and/or object class. To counteract sparse detection density, detections can be aggregated over multiple time frames of the radar. This aggregation generally requires knowledge of a relative speed of the object with respect to the radar. However, objects often can have an unknown relative speed. Therefore, this aggregation can cause detections to disperse over time, making distinguishing nearby objects from each other difficult and diminishing the accuracy with which class and shape can be estimated. Accordingly, it is desirable to provide a method for aggregating detections over time frames that maintains a resolution of the objects in the environment.

SUMMARY

In one exemplary embodiment, a method of operating a host vehicle is disclosed. The method includes receiving a first detection of a first reflection point from an object during a first time frame of a radar, determining a first position and a first Doppler frequency of the first detection, updating the first position to a first predicted position in a second time frame using the first Doppler frequency, receiving a second detection of a second reflection point from the object, and detecting the object from the first predicted position in the second time frame and the second detection. Updating the first position includes determining an object-based component of the first Doppler frequency for the first detection from the first Doppler frequency by removing an effect of a velocity of the host vehicle from the first Doppler frequency, shifting the first detection from the first position to an intermediate position in the second time frame using the object-based component of the first Doppler frequency, and shifting the first detection from the intermediate position to the first predicted position in the second time frame using a vehicle-based component of the first Doppler frequency.

In addition to one or more of the features described herein, the method further includes receiving the second detection of the second reflection point from the object during the first time frame, determining a second position of the second detection and a second Doppler frequency for the second detection, updating the second position to a second predicted position in the second time frame based on calculations using the second Doppler frequency, and detecting the object from the first predicted position in the second time frame and the second predicted position in the second time frame.

In addition to one or more of the features described herein, the method further includes updating the first predicted position in the second time frame to a second predicted position in a third time frame based on a first calculation using the first Doppler frequency and the velocity of the host vehicle obtained in the second time frame.

In addition to one or more of the features described herein, the method further includes receiving the second detection within the second time frame, determining a second position of the second detection and a second Doppler frequency for the second detection in the second time frame, and updating the second position to a third predicted position in the third time frame using a second calculation based on the second Doppler frequency.

In addition to one or more of the features described herein, detecting the object further includes determining at least one of a position of the object, a shape of the object, an orientation of the object, and a class of the object.

In addition to one or more of the features described herein, wherein the first time frame is one of a plurality of temporally-spaced time frames, the method further includes selecting a subset of the plurality of temporally-spaced time frames using a moving time window.

In addition to one or more of the features described herein, the method further includes controlling the host vehicle to navigate the host vehicle with respect to the object based on the first predicted position and the second detection.

In another exemplary embodiment, a system for operating a host vehicle is disclosed. The system includes a processor configured to receive a first detection of a first reflection point from an object during a first time frame of a radar, determine a first position and a first Doppler frequency of the first detection, update the first position to a first predicted position in a second time frame using the first Doppler frequency, receive a second detection of a second reflection point from the object, and detect the object from the first predicted position in the second time frame and the second detection. Updating the first position includes determining an object-based component of the first Doppler frequency for the first detection from the first Doppler frequency by removing an effect of a velocity of the host vehicle from the first Doppler frequency, shifting the first detection from the first position to an intermediate position in the second time frame using the object-based component of the first Doppler frequency, and shifting the first detection from the intermediate position to the first predicted position in the second time frame using a vehicle-based component of the first Doppler frequency.

In addition to one or more of the features described herein, the processor is further configured to receive the second detection during the first time frame, determine a second position of the second detection and a second Doppler frequency for the second detection, update the second position to a second predicted position in the second time frame based on calculations using the second Doppler frequency, and detect the object from the first predicted position in the second time frame and the second predicted position in the second time frame.

In addition to one or more of the features described herein, the processor is further configured to update the first predicted position in the second time frame to a second predicted position in a third time frame based on a first calculation using the first Doppler frequency and the velocity of the host vehicle obtained in the second time frame.

In addition to one or more of the features described herein, the processor is further configured to receive the second detection within the second time frame, determining a second position of the second detection and a second Doppler frequency for the second detection in the second time frame, and update the second position to a third predicted position in the third time frame using a second calculation based on the second Doppler frequency.

In addition to one or more of the features described herein, the processor is further configured to detect the object by determining at least one of a position of the object, a shape of the object, an orientation of the object, and a class of the object.

In addition to one or more of the features described herein, the first time frame is one of a plurality of temporally-spaced time frames and the processor is further configured to select a subset of the plurality of temporally-spaced time frames using a moving time window.

In addition to one or more of the features described herein, the processor is further configured to control the host vehicle to navigate the host vehicle with respect to the object based on the first predicted position and the second detection.

In yet another exemplary embodiment, a host vehicle is disclosed. The host vehicle includes a system for controlling navigation of the host vehicle and a processor. The processor is configured to receive a first detection of a first reflection point from an object during a first time frame of a radar, determine a first position and a first Doppler frequency of the first detection, update the first position to a first predicted position in a second time frame using the first Doppler frequency, receive a second detection from a second reflection point from the object, detect the object from the first predicted position in the second time frame and the second detection, and control the system to navigate the host vehicle with respect to the object. Updating the first position includes determining an object-based component of the first Doppler frequency for the first detection from the first Doppler frequency by removing an effect of a velocity of the host vehicle from the first Doppler frequency, shifting the first detection from the first position to an intermediate position in the second time frame using the object-based component of the first Doppler frequency, and shifting the first detection from the intermediate position to the first predicted position in the second time frame using a vehicle-based component of the first Doppler frequency.

In addition to one or more of the features described herein, the processor is further configured to receive the second detection at the first time frame, determine a second position of the second detection and a second Doppler frequency for the second detection, update the second position to a second predicted position in the second time frame based on calculations using the second Doppler frequency, and detect the object from the first predicted position in the second time frame and the second predicted position in the second time frame.

In addition to one or more of the features described herein, the processor is further configured to update the first predicted position in the second time frame to a second predicted position in a third time frame based on a first calculation using the first Doppler frequency and the velocity of the host vehicle obtained in the second time frame.

In addition to one or more of the features described herein, the processor is further configured to receive the second detection within the second time frame, determining a second position of the second detection and a second Doppler frequency for the second detection in the second time frame, and update the second position to a third predicted position in the third time frame using a second calculation based on the second Doppler frequency.

In addition to one or more of the features described herein, the processor is further configured to detect the object by determining at least one of a position of the object, a shape of the object, an orientation of the object, and a class of the object.

In addition to one or more of the features described herein, the first time frame is one of a plurality of temporally-spaced time frames and the processor is further configured to select a subset of the plurality of temporally-spaced time frames using a moving time window.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
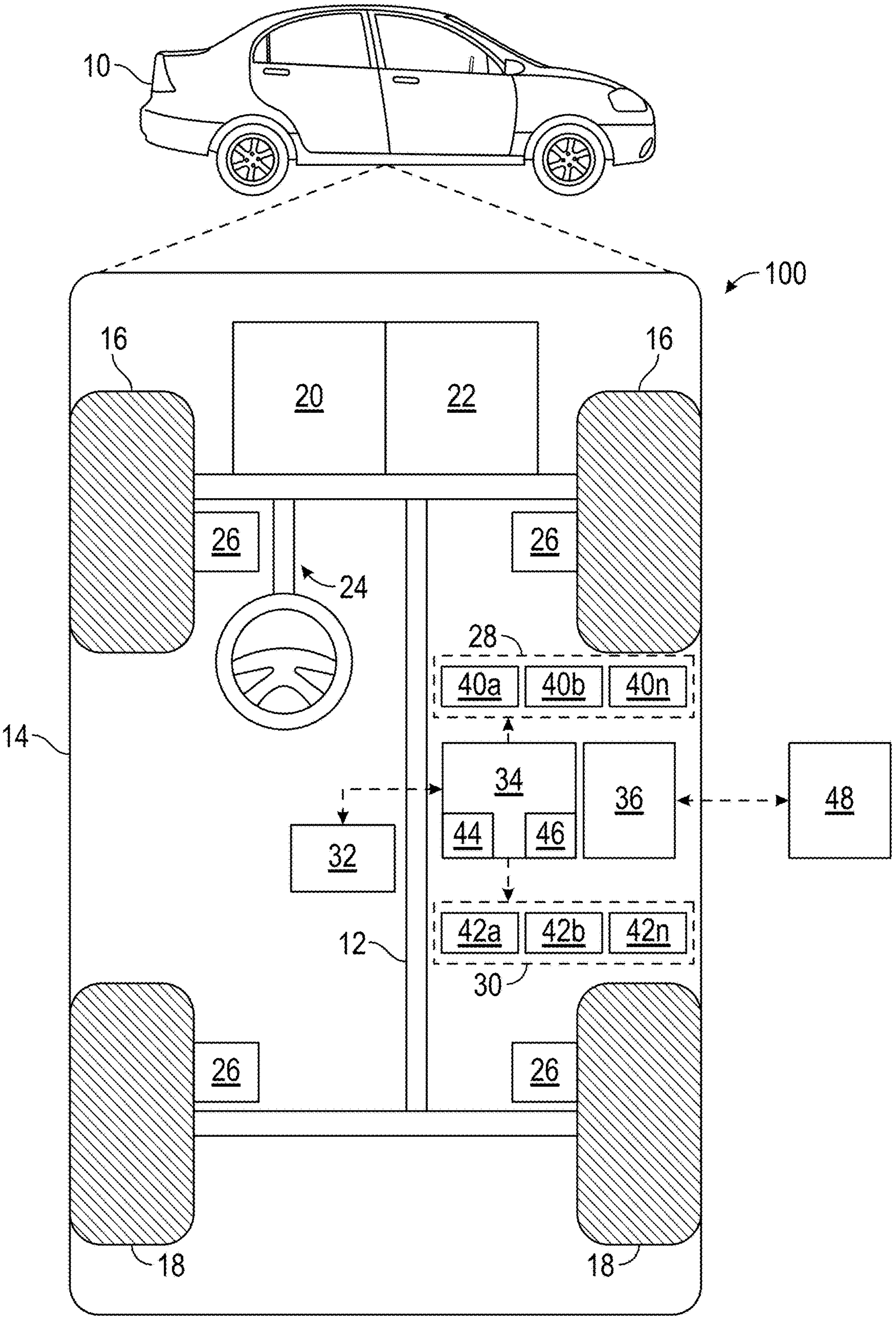
FIG. 1 shows a vehicle with an associated trajectory planning system.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10 with an associated trajectory planning system 100. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near respective corners of the body 14.

In various embodiments, the vehicle 10 is an autonomous vehicle and the trajectory planning system 100 is incorporated into the autonomous vehicle. The autonomous vehicle is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, and/or other sensors. The sensor system 28 can also include dynamic sensors for measuring one or more dynamic parameters of the vehicle. Exemplary dynamic sensors include an inertial measurement unit (IMU) that measures accelerations at the vehicle in three dimensions, a steering angle sensor, a torque sensor, a yaw rate sensor, a wheel velocity sensor, etc.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air conditioning, music, lighting, etc. (not shown).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the trajectory planning system 100 and, when executed by the processor 44, determines an aggregation of radar cloud points or detections of reflection points from one or more objects obtained by a radar during a first time frame, updates the detections to subsequent time frames to maintain a resolution of the one or more objects, detects an object from the aggregation of detections, and controls an operation of the vehicle, such as by controlling one or more of a steering system, an actuator system, a braking system, etc., to navigate the vehicle with respect to the object.

The communication system 36 is configured to wirelessly communicate information to and from other entities 48, such as but not limited to, other vehicles ("V2V" communication,) infrastructure ("V2I" communication), remote systems, Global Positioning Satellite (GPS), map servers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
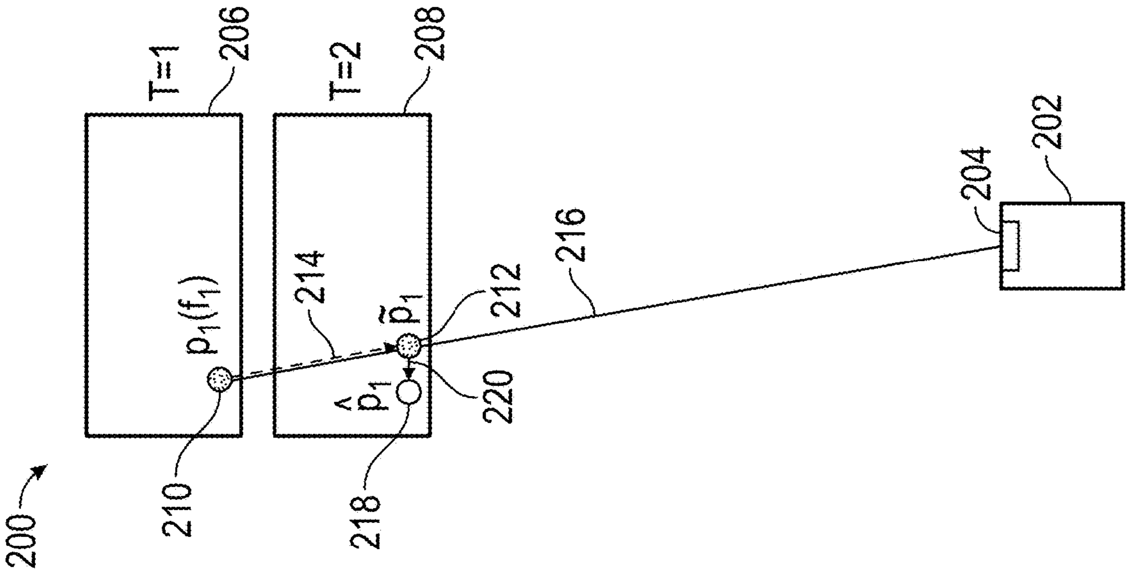
FIG. 2 is a diagram illustrating a method disclosed herein for updating positions of detections between time frames of a radar.

FIG. 2 is a diagram 200 illustrating a method disclosed herein for updating positions of detections between time frames of a radar. The diagram 200 is shown in a plan view. A host vehicle 202 includes a radar 204. The host vehicle 202 can be stationary or moving with a host vehicle velocity $v_e$. The radar 204 obtains detections of reflection points from an object at one or more time frames. A first time frame 206 (T=1) and a second time frame 208 (T=2) are shown for illustrative purposes. During a time gap T between the first time frame 206 and the second time frame 208, the object can move with respect to the radar 204 and the host vehicle 202. For illustrative purposes, the second time frame 208 is shown closer to the host vehicle 202 than the first time frame 206 to account for relative movement between the host vehicle and the object. The method disclosed herein updates the position of a detection obtained from the object at an earlier time frame (e.g., the first time frame 206) to estimate a predicted position in a subsequent time frame (e.g., the second time frame 208). The method further includes that the predicted position of the detection can be aggregated with detections obtained in the subsequent time frame. The aggregated detections can be processed to estimate one or more of a position of the object; a shape of the object, an orientation of the object, a class of the object, etc.

A first detection 210 (i.e., first reflection point) is obtained at a first time frame (T=1). The first detection 210 is located at a first position $p_1$ with respect to the host vehicle 202, where $p_1=(x_1, y_1, z_1)$. Typically, a first Doppler frequency $f_1$ for the first detection 210 is measured at the radar 204 at the same time that the position $p_1$ is determined. The first detection 210 is updated to the second time frame (T=2) using the first Doppler frequency. The updating involves a multi-step process. In a first step, the first Doppler frequency $f_1$ associated with the first detection 210 is obtained. The Doppler frequency can be separated into a first component (an object-based component) that is due to the velocity of the object and a second component (a vehicle-based component) that is due to the velocity of the host vehicle. An object-based component of the Doppler frequency is calculated from the first Doppler frequency based on a speed $v_e$ of the host vehicle 202. Specifically, the object-based component of the Doppler frequency is calculated by removing the effects of the velocity of the host vehicle from the Doppler frequency. Stated generally for an $i^{th}$ detection, the object-based component of the Doppler frequency is calculated as shown in Eq. (1):

$$\tilde{f}_i = f_i - \frac{2v_e^T p_i}{\lambda \|p_i\|} \qquad \text{Eq. (1)}$$

where $f_i$ is the Doppler frequency of the $i^{th}$ detection, $\tilde{f}_i$ is the object-based component of the Doppler frequency of the $i^{th}$ detection, $p_i$ is the position coordinate of the $i^{th}$ detection in the $n^{th}$ time frame, $$v_e^T$$

is a transpose of the velocity vector of the host vehicle 202, and λ is the radar wavelength of the radar 204. The velocity $v_e$ of the host vehicle 202 can be obtained from the speedometer of the vehicle or any other suitable device, such as GPS. Alternatively, the velocity of the host vehicle $v_e$ can be estimated by radar.

In the second step, the object-based component of the Doppler frequency is used to shift the position of the detection to an intermediate position 212 for the detection in the second time frame (T=2). Calculating the intermediate position 212 can be stated generally for an $i^{th}$ detection as shown in Eq. (2):

$$\tilde{p}_i = p_i - \frac{\lambda T}{2}\tilde{f}_i \frac{p_i}{\|p_i\|} \qquad \text{Eq. (2)}$$

where $\tilde{p}_i$ is the intermediate position for the $i^{th}$ detection in the $(n+1)^{th}$ time frame (e.g., second time frame 208), $p_i$ is the original position of the detection ($p_i=(x_i, y_i, z_i)$) and T is the time duration between the $n^{th}$ time frame (e.g., first time frame) and the $(n+1)^{th}$ time frame (e.g., second time frame). The shift from the original position to the intermediate position is shown by first shift vector 214. The first shift vector 214 is directed along a radial line 216 between the first detection 210 and the radar 204.

In a third step, a first predicted position 218 for the detection in the second time frame is determined by shifting the intermediate position 212 based on a vehicle-based component of the Doppler frequency. The vehicle-based component of the Doppler frequency is based on the speed $v_e$ of the host vehicle 202. Calculating the first predicted position 218 for the detection from the intermediate position 212 is stated generally for an $i^{th}$ detection as shown in Eq. (3):

$$\hat{p}_i = \tilde{p}_i - v_e T \qquad \text{Eq. (3)}$$

where $\hat{p}_i$ is the predicted position of the $i^{th}$ detection in the $(n+1)^{th}$ time frame (e.g., second time frame 208) and $\tilde{p}_i$ is the intermediate position 212 for the $i^{th}$ detection in the $(n+1)^{th}$ time frame (e.g., second time frame 208). An adjustment for the vehicle-based component of the Doppler frequency due to the velocity the host vehicle 202 is shown by second shift vector 220.

Figure 3:
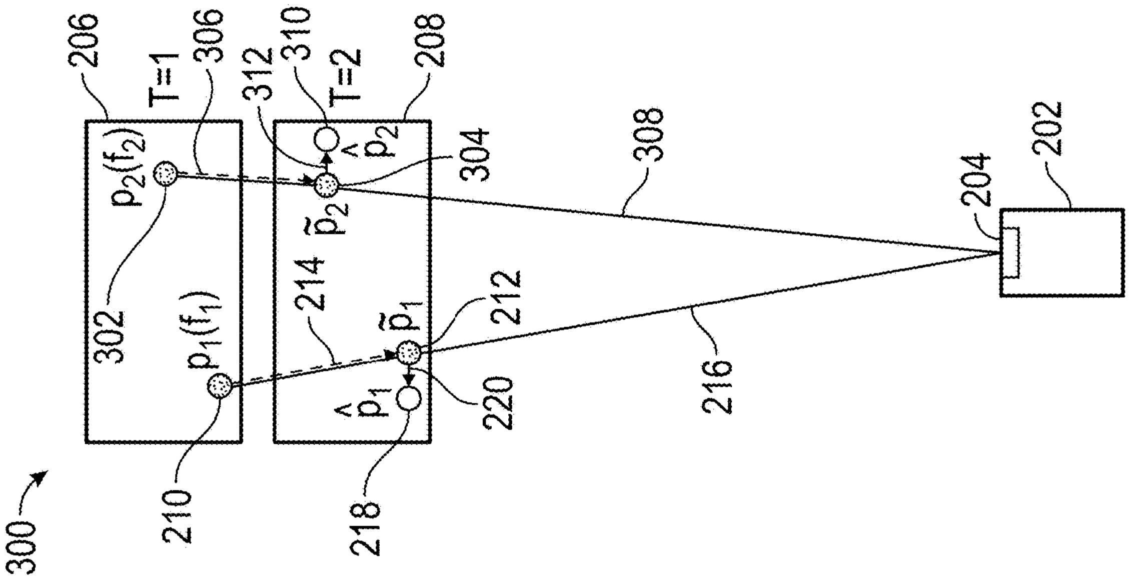
FIG. 3 is a diagram illustrating a method of updating multiple detections obtained at a first time frame.

FIG. 3 is a diagram 300 illustrating a method of updating multiple detections obtained at a first time frame 206. A first detection 210 ($p_1$) and a second detection 302 ($p_2$) are obtained shown in the first time frame 206. The second detection 302 is a detection of a second reflection of the object. A first Doppler frequency $f_1$ is associated with the first detection 210 and a second Doppler frequency $f_2$ is associated with the second detection 302. The first detection 210 is updated to a first predicted position 218 ($\hat{p}_1$) using calculations discussed in Eqs. (1)-(3) based on the first Doppler frequency $f_1$ and the second detection 302 is updated to a second predicted position 310 ($\hat{p}_2$) using calculations discussed in Eqs. (1)-(3) based on the second Doppler frequency $f_2$. The updating process disclosed herein moves the second detection 302 ($p_2$) to a second intermediate position 304 ($\tilde{p}_2$) using a third shift vector 306 direction along a second radial line 308 extending between the radar 204 and the second detection 302 ($p_2$). The process then calculates the second predicted position 310 ($\hat{p}_2$) by adding an adjustment to the second intermediate position 304 ($\tilde{p}_2$) using the velocity of the host vehicle 202 (shown by fourth shift vector 312).

Figure 4:
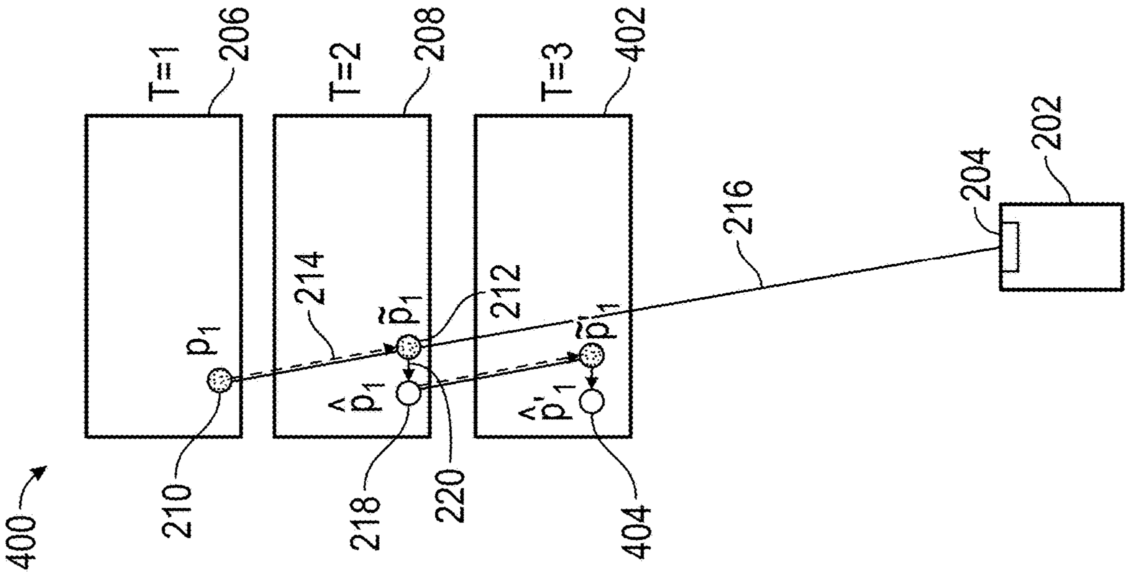
FIG. 4 is a diagram illustrating updating of a single detection over multiple time frames.

FIG. 4 is a diagram 400 illustrating updating of a single detection over multiple time frames. A first time frame 206, second time frame 208 and third time frame 402 are shown for illustrative purposes. The first detection 210 is obtained during the first time frame 206. The updating methods disclosed herein with respect to FIG. 2 are used to calculate the first predicted position 218 of the detection in the second time frame 208, based on calculations using the associated Doppler frequency (i.e., $f_1$). The first predicted position 218 ($\hat{p}_1$) is then updated to a second predicted position 404 ($\hat{p}'_1$) for the detection at the third time frame 402 using the same calculations. The calculations for determining the second predicted position 404 from the first predicted position 218 are based on the Doppler frequency $f_1$ obtained in the first time frame 206 and a velocity obtained in the second time frame 208. For subsequently time frames, a predicted position is calculated using the original Doppler frequency (obtained in the first time frame) and the velocity of the host vehicle 202 obtained in the immediately previous time frame.

Figure 5:
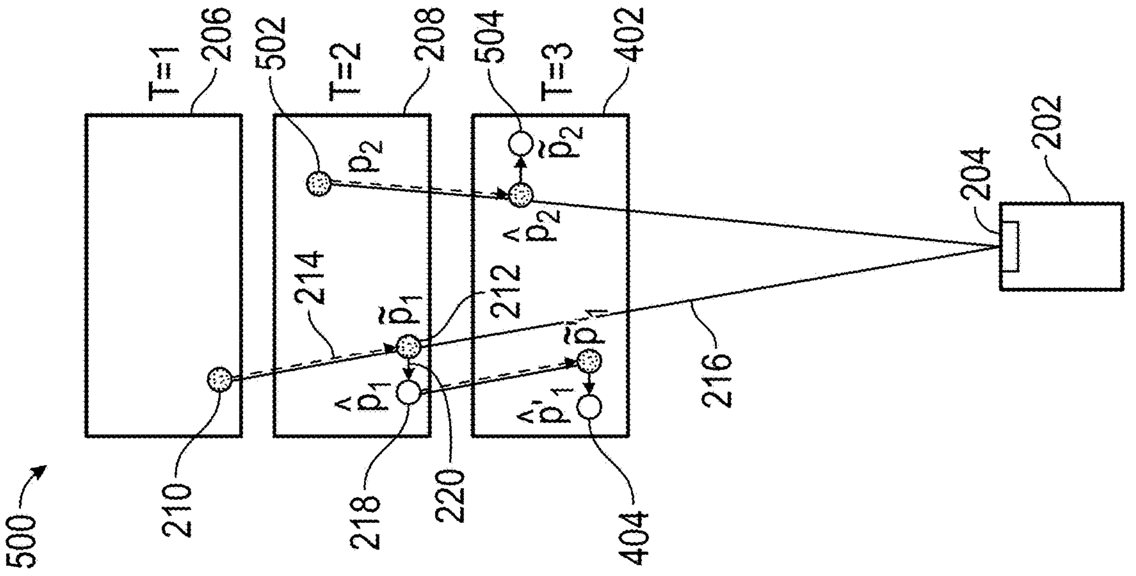
FIG. 5 is a diagram illustrating updating detections obtained during separate time frames over multiple time frames.

FIG. 5 is a diagram 500 illustrating updating detections obtained during separate time frames over multiple time frames. A first time frame 206, second time frame 208 and third time frame 402 are shown for illustrative purposes. The first detection 210 is obtained during the first time frame 206. The updating methods disclosed herein with respect to FIG. 2 are used to calculate the first predicted position 218 ($\hat{p}_1$) for the first detection in the second time frame 208, using the associated Doppler frequency (i.e., $f_1$). At the second time frame 208, the radar 204 obtains a second detection 502. A second Doppler frequency $f_2$ is associated with the second detection 502. The second detection 502 has a position $p_2$ in the second time frame 208.

The first predicted position 218 ($\hat{p}_1$) in the second time frame 208 is updated to a second predicted position 404 ($\hat{p}'_1$) in the third time frame 402 based on calculations using the first Doppler frequency $f_1$ and the host velocity obtained in the second time frame 208. The second position $p_2$ of the second detection 502 in the second time frame 208 is updated to a third predicted position 504 ($\hat{p}_2$) in the third time frame using the second Doppler frequency $f_2$ obtained in the second time frame and the velocity of the host vehicle 202 obtained in the second time frame.

Figure 6:
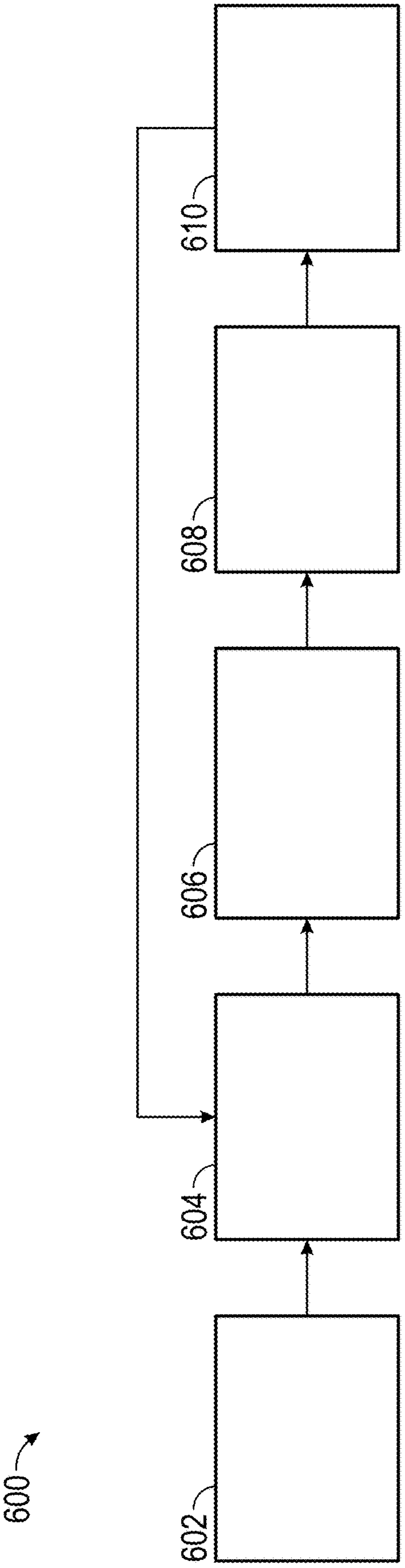
FIG. 6 shows a flowchart of a method for detecting an object in an illustrative embodiment.

FIG. 6 shows a flowchart 600 of a method for detecting an object in an illustrative embodiment. At box 602, one or more radar detections of reflection points from the object are obtained at an $n^{th}$ time frame, (e.g., at a first time frame 206). At box 604, the one or more radar detections at the $n^{th}$ time frame are aggregated with one or more radar detections from a previous (e.g., $(n-1)^{th}$) time frame. The aggregation can include radar detections within a subset of a plurality of temporally-spaced time frames, where the subset is selected using a moving time window associated with a most current time window of the plurality of time frames. Therefore, radar detections from the $(n\text{-}m)^{th}$ time frame to the $n^{th}$ time frame, where n is the current time frame and m indicates a time duration of the moving time window. Also, if n=1 (i.e., there are no previous detections), the aggregation step of box 604 can be skipped or the aggregation is with an empty set.

From box 604, the method proceeds to box 606. In box 606, an object-based component of the Doppler frequency $\tilde{f}_i$ associated with each detection is obtained by removing an effect of the velocity of the host vehicle from the Doppler frequency $f_i$ associated with the respective detection. In box 608, the object-based component of the Doppler frequency $\tilde{f}_i$ is used to determine an intermediate position $\tilde{p}_i$ within a next (e.g. $(n+1)^{th}$) time frame for each detection. In box 610, a predicted position $\hat{p}_i$ for the detection is calculated from the intermediate position $\tilde{p}_i$ and the velocity of the host vehicle. From box 610, the process can return to box 604 in which the predicted positions of the detections in the new frame are aggregated or merged with new radar detections obtained in the new frame.

Additionally, the predicted position(s) in box 610 can be used in subsequent calculations. The subsequent calculations include one or more of determining the location or position of the object, determining a shape of the object, determining an orientation of the object, classifying object, and controlling the vehicle to perform one or more maneuvers with respect to the object. The aggregated detections increase a resolution of a radar image of the object and thus provide an increased ability of the host vehicle to maneuver with respect to the object.

Figure 7:
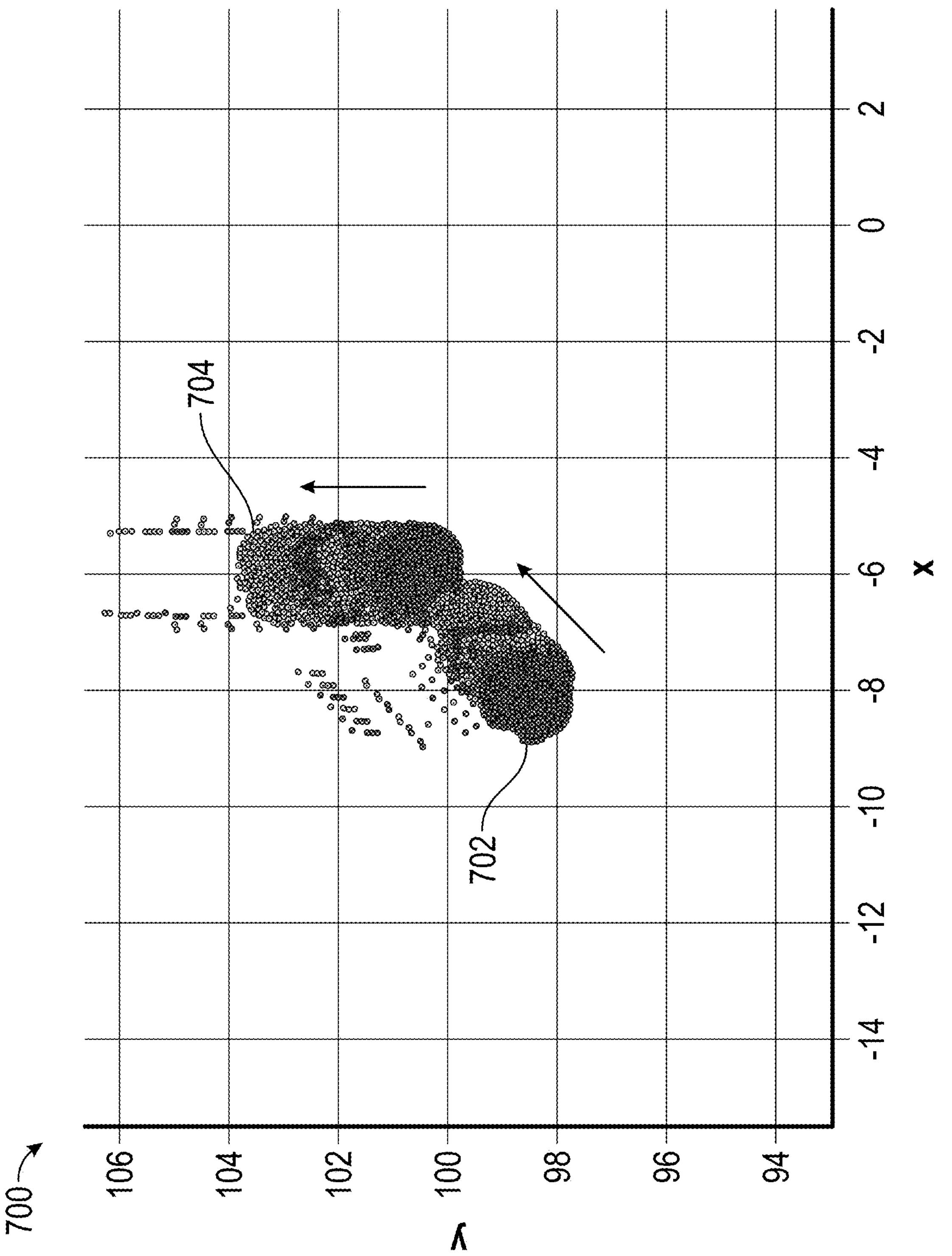
FIG. 7 shows a plan view of an area having a first vehicle and a second vehicle therein.

FIG. 7 shows a plan view 700 of an area having a first vehicle 702 and a second vehicle 704 therein. A graph is shown having an x-axis and a y-axis. The locations of the first vehicle 702 and of the second vehicle 704 are shown over several time frames. The second vehicle 740 is moving along the y-axis. The first vehicle 702 moves into a space vacated by the second vehicle 704. All of the radar detections from the first vehicle 702 and the second vehicle 704 blend together to form cloud of detections that cannot be used to distinguish the vehicle from each other.

Figure 8:
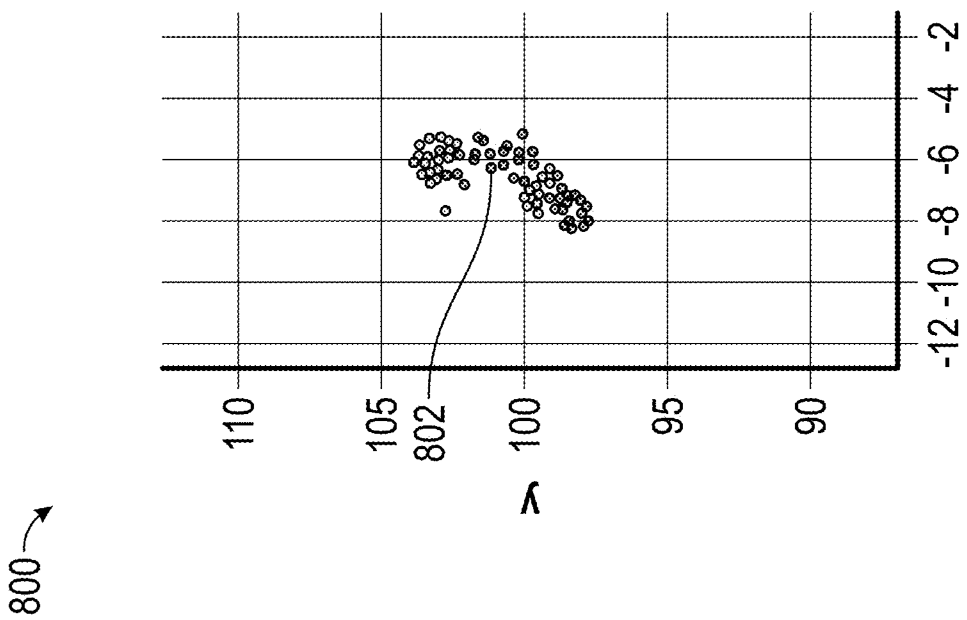
FIG. 8 shows a plan view of the area including detections calculated using a conventional time aggregation method.

FIG. 8 shows a plan view 800 of the area including detections calculated using a conventional time aggregation method. The area includes a single collection of detections 802 which cannot be used to distinguish the first vehicle 702 from the second vehicle 704.

Figure 9:
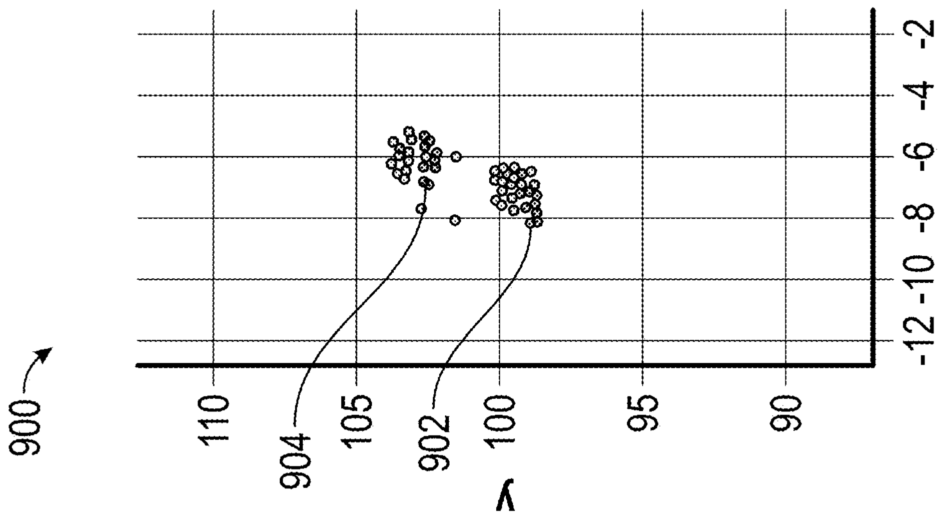
FIG. 9 shows a plan view of the area including detections calculated using the time aggregation method disclosed herein.

FIG. 9 shows a plan view 900 of the area including detections calculated using the time aggregation method disclosed herein. The area includes a first group 902 of detections and a second group 904 of detections. The first group 902 and the second group 904 are distinguishable from each other and thus can be used to distinguish the first vehicle 702 from the second vehicle 704.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a host vehicle, comprising:

receiving a first detection of a first reflection point from an object during a first time frame of a radar;

determining a first position and a first Doppler frequency of the first detection;

updating the first detection from the first position to a first predicted position in a second time frame, wherein updating includes:

determining a first velocity of the host vehicle during the first time frame;

determining an object-based component of the first Doppler frequency for the first detection from the first Doppler frequency by removing an effect of the first velocity of the host vehicle during the first frame from the first Doppler frequency;

shifting the first detection from the first position to a first intermediate position in the second time frame using the object-based component of the first Doppler frequency;

shifting the first detection from the first intermediate position to the first predicted position in the second time frame using the first velocity;

updating the first detection from the first predicted position to a second predicted position in a third time frame, wherein updating includes:

determining a second velocity of the host vehicle during the second time frame;

shifting the first detection from the first predicted position in the second time frame to a second intermediate position in the third time frame using the object-based component of the first Doppler frequency from the first time frame;

shifting the first detection from the second intermediate position in the third time frame to the second predicted position in the third time frame using the second velocity; and detecting the object from the second predicted position in the third time frame.

2. The method of claim 1, further comprising:

receiving a second detection of a second reflection point from the object during the first time frame;

determining a second position of the second detection and a second Doppler frequency for the second detection;

updating the second position to a second predicted position in the second time frame based on calculations using the second Doppler frequency; and detecting the object from the first predicted position in the second time frame and the second predicted position in the second time frame.

3. The method of claim 1, further comprising receiving a second detection within the second time frame, determining a second position of the second detection and a second Doppler frequency for the second detection in the second time frame, and updating the second position to a third predicted position in the third time frame using a second calculation based on the second Doppler frequency.

4. The method of claim 1, wherein detecting the object further comprises determining at least one of: (i) a position of the object; (ii) a shape of the object; (iii) an orientation of the object; and (iv) a class of the object.

5. The method of claim 1, wherein the first time frame is one of a plurality of temporally-spaced time frames, further comprising selecting a subset of the plurality of temporally-spaced time frames using a moving time window.

6. The method of claim 1, further comprising controlling the host vehicle to navigate the host vehicle with respect to the object based on the second predicted position.

7. The method of claim 1, further comprising obtaining a radar detection of the object at the third time frame and aggregating the radar detection with the second predicted position in the third time frame.

8. A system for operating a host vehicle, comprising:

a processor configured to:

receive a first detection of a first reflection point from an object during a first time frame of a radar;

determine a first position and a first Doppler frequency of the first detection;

update the first detection from the first position to a first predicted position in a second time frame, wherein updating includes:

determining a first velocity of the host vehicle during the first time frame;

determining an object-based component of the first Doppler frequency for the first detection from the first Doppler frequency by removing an effect of the first velocity of the host vehicle during the first time frame from the first Doppler frequency;

shifting the first detection from the first position to a first intermediate position in the second time frame using the object-based component of the first Doppler frequency;

shifting the first detection from the first intermediate position to the first predicted position in the second time frame using the first velocity;

update the first detection from the first predicted position to a second predicted position in a third time frame, wherein updating includes:

determining a second velocity of the host vehicle during the second time frame;

shifting the first detection from the first predicted position in the second time frame to the second intermediate position in the third time frame using the object-based component of the first Doppler frequency from the first time frame;

shifting the first detection from the second intermediate position in the third time frame to the second predicted position in the third time frame using the second velocity; and detect the object from the second predicted position in the third time frame.

9. The system of claim 8, wherein the processor is further configured to:

receive a second detection of a second reflection point during the first time frame;

determine a second position of the second detection and a second Doppler frequency for the second detection;

update the second position to a second predicted position in the second time frame based on calculations using the second Doppler frequency; and detect the object from the first predicted position in the second time frame and the second predicted position in the second time frame.

10. The system of claim 8, wherein the processor is further configured to receive a second detection within the second time frame, determine a second position of the second detection and a second Doppler frequency for the second detection in the second time frame, and update the second position to a third predicted position in the third time frame using a second calculation based on the second Doppler frequency.

11. The system of claim 8, wherein the processor is further configured to detect the object by determining at least one of: (i) a position of the object; (ii) a shape of the object; (iii) an orientation of the object; (iv) a class of the object.

12. The system of claim 8, wherein the first time frame is one of a plurality of temporally-spaced time frames and the processor is further configured to select a subset of the plurality of temporally-spaced time frames using a moving time window.

13. The system of claim 8, wherein the processor is further configured to control the host vehicle to navigate the host vehicle with respect to the object based on the second predicted position.

14. The system of claim 8, wherein the processor is further configured to obtain a radar detection of the object at the third time frame and aggregate the radar detection with the second predicted position in the third time frame.

15. A host vehicle, comprising:

a system for controlling navigation of the host vehicle;

a processor configured to:

receive a first detection of a first reflection point from an object during a first time frame of a radar;

determine a first position and a first Doppler frequency of the first detection;

update the first detection from the first position to a first predicted position in a second time frame, wherein updating includes:

determining a first velocity of the host vehicle during the first time frame;

determining an object-based component of the first Doppler frequency for the first detection from the first Doppler frequency by removing an effect of the first velocity of the host vehicle during the first time frame from the first Doppler frequency;

shifting the first detection from the first position to a first intermediate position in the second time frame using the object-based component of the first Doppler frequency;

shifting the first detection from the first intermediate position to the first predicted position in the second time frame using the first velocity;

update the first detection from the first predicted position to a second predicted position in a third time frame, wherein updating includes:

determining a second velocity of the host vehicle during the second time frame;

shifting the first detection from the first predicted position in the second time frame to the second intermediate position in the third time frame using the object-based component of the first Doppler frequency from the first time frame;

shifting the first detection from the second intermediate position in the third time frame to a second predicted position in the third time frame using the second velocity; and detect the object from the second predicted position in the third time frame.

16. The host vehicle of claim 15, wherein the processor is further configured to:

receive a second detection of a second reflection point at the first time frame;

determine a second position of the second detection and a second Doppler frequency for the second detection;

update the second position to a second predicted position in the second time frame based on calculations using the second Doppler frequency; and detect the object from the first predicted position in the second time frame and the second predicted position in the second time frame.

17. The host vehicle of claim 15, wherein the processor is further configured to receive a second detection within the second time frame, determine a second position of the second detection and a second Doppler frequency for the second detection in the second time frame, and update the second position to a third predicted position in the third time frame using a second calculation based on the second Doppler frequency.

18. The host vehicle of claim 15, wherein the processor is further configured to detect the object by determining at least one of: (i) a position of the object; (ii) a shape of the object; (iii) an orientation of the object; and (iv) a class of the object.

19. The host vehicle of claim 15, wherein the first time frame is one of a plurality of temporally-spaced time frames and the processor is further configured to select a subset of the plurality of temporally-spaced time frames using a moving time window.

20. The vehicle of claim 15, wherein the processor is further configured to obtain a radar detection of the object at the third time frame and aggregate the radar detection with the second predicted position in the third time frame.

* * * * *